May 16, 1967  J. P. RENSHAW  3,319,416
ENGINE FUNCTION TIMING CONTROL
Filed Sept. 24, 1965  2 Sheets-Sheet 1

JOHN P. RENSHAW
INVENTOR.

BY
*Townsend and Townsend*

JOHN P. RENSHAW
INVENTOR.

BY

Townsend & Townsend

United States Patent Office 3,319,416
Patented May 16, 1967

3,319,416
ENGINE FUNCTION TIMING CONTROL
John P. Renshaw, 340 Pine St.,
San Francisco, Calif. 94104
Filed Sept. 24, 1965, Ser. No. 489,938
12 Claims. (Cl. 60—24)

This invention relates to an improvement of an external heat engine such as one using the Stirling cycle.

One embodiment of the Stirling-type engine incorporates a pair of pistons mounted within a common cylinder in which captive gas is flowed from a space between the cylinder head and the displacement piston, to a space between the displacement piston and the power piston. External heat is added to the total gas system from the cylinder head to the heat regenerator; and heat is removed to the outside from the total gas system between the regenerator and the space between the displacement and power pistons. The regenerator merely alternatively stores then releases heat from and to the gas itself. The engine or motor is provided with power because of the net gas pressure differentials on the power piston during various phases of operation.

One of the principal difficulties in practically constructing engines of the aforesaid character lies in the mechanism for timing in a practical manner the mechanical motion of the power and displacement pistons so that their relative movements are close to their optimum phase relationships to achieve maximum efficiency. The present invention is concerned with a novel mechanism which functions to interdrive the power and displacement pistons in such a manner as to achieve almost optimum relative movements of the two pistons. This gearing mechanism is connected to the power and displacement pistons and arranged to cause the power and displacement pistons to dwell for relatively long intervals near their respective positions of top dead center and bottom dead center, and to move relatively rapidly, yet effectively, between near the top and bottom dead center positions at the proper timed intervals.

Another object of this invention is to provide a simple gear train part of which is formed of a combination of center-shafted, varying-radius gears arranged with one of the varying-radius gears attached directly to the power output shaft of the engine, and two interdriven varying-radius gears respectively connected to the power and displacement pistons of the engine in such a way as to provide a varying gear ratio between the power output shaft and the respective power and displacement pistons during various phases of each revolution of operation, said gears being timed to obtain the desired relative piston movement relationship.

A feature and advantage of this invention lies in the fact that the gearing mechanism is readily adaptable to opposed cylinder configurations which function effectively in push-pull operation. This in turn makes possible the elimination of a buffer zone of varying pressure between the power piston and the cylinder base. A tube passageway connects these spaces of each cylinder so as to minimize pressure variations.

A further feature and advantage of this invention lies in the fact that the changing gear ratio during different phases of each revolution has a tendency, because of rotative kinetic energy changes of the equivalent of each crankshaft assembly, to change or equalize torque distribution to the power output shaft during operation of the invention to render the operation in a more regular or smooth mode.

In the Stirling-type engine, it is believed desirable to have the displacement piston relatively fixed near lower bottom dead center during the power stroke during which downward movement of the power piston occurs. It is further desirable that the power piston remain relatively near bottom dead center after the power stroke until the displacement piston is moved to top dead center. This achieves the maximum amount of useful gas capacity between the two pistons. In the present invention the aforesaid cyclic relationship is readily obtainable.

Another object of this invention lies in the flexibility of the gearing mechanism being readily adaptable to applications wherein the motor is the mechanically timed and driven, rather than the driving agency, in order to create a refrigerant mode of operation.

Other objects, features, and advantages of the present invention will be more apparent after referring to the following specification and attached drawings in which.

Figure 1:
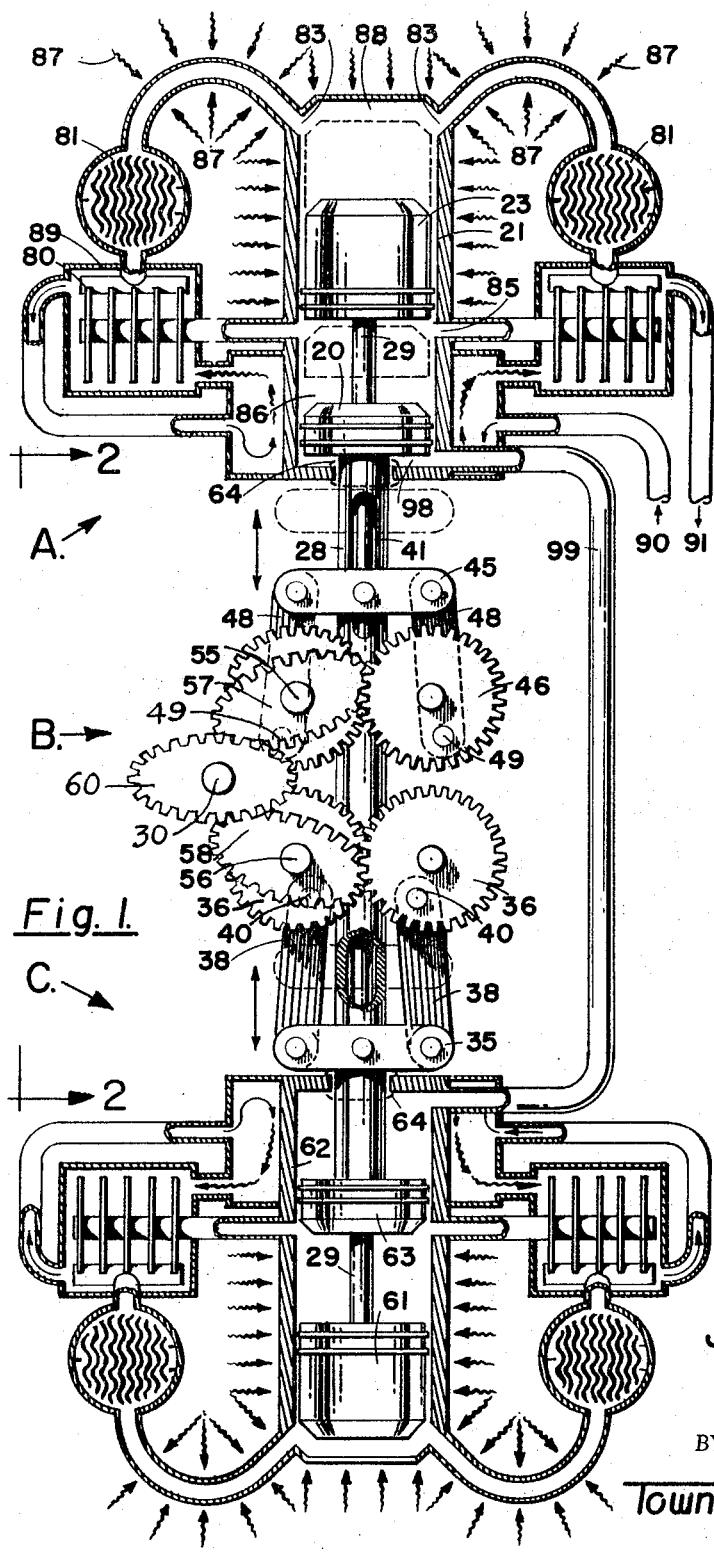
FIG. 1 is a cross-sectional view of the principal embodiment of the invention.
Figure 2:
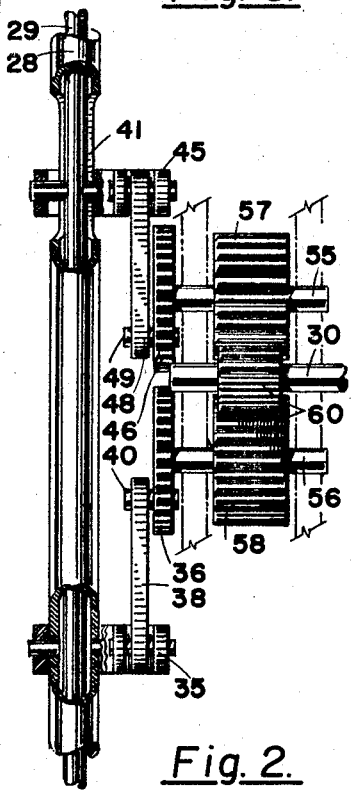
FIG. 2 is a fragmentary sectional view taken at line two of FIG. 1.

As shown in FIGS. 1 and 2, there is provided a Stirling-type engine incorporating the principal embodiment of this invention in which is provided a cylinder A having a power piston 20 reciprocally mounted within the bore 21 of cylinder A and a displacement piston 23 similarly reciprocally mounted above the power piston within the bore of cylinder 21. Power piston 20 is connected rigidly to shaft 28. Displacement piston 23 is connected to shaft 29, which is connected to the bottom of piston 23, and in sliding penetration through the center of power piston 20 and into the center of shaft 28. Shaft 28 is provided with a bore of sufficient diameter to allow shaft 29 to reciprocate freely.

Shafts 28 and 29 are reciprocated by a gear train B which couples the two shafts in timed relation and transfers the torque to rotating power output shaft 30. Connection of gear train B to shaft 28 is accomplished through a coupling arrangement including the cross-bar arm 35 connected to shaft 28 and extending laterally to both sides thereof. The cross-bar arm 35 of shaft 28 extends far enough to each side of the shaft so that the extension of the line of action of the junction of each arm with its connecting rod will pass through, or almost through, the axis of the timing gear to which it is attached. This alignment is important, and makes possible simple opposed cylinder operation if the ratio of the connecting rod length to the stroke is not too small. In other systems such as the so-called "rhombic drive" the above line of action passes a considerable distance from the axis of the timing gear in order to function. The latter system gives imperfect piston action and does not lend itself to opposed cylinder operation.

A pair of conversion gears 36 are pivotally mounted above cross-bar arm 35. The two gears 36 are intermeshed of equal diameter so as to facilitate their equal timed rotation. Gears 36 are connected to cross-bar arm 35 via connecting rods 38 which are connected to off-center bearings 40 on each of the two gears. These bearings are really the crank-pins of a crankshaft. Thus, in crankshaft fashion the movement of piston 20 and its connected shaft 28 will cause reciprocation of the crossarm 35; this in turn will cause rotation of the two gears 36. A similar arrangement is utilized to reciprocate shaft 29 attached to the displacement piston. Shaft 29, through a slot 41 formed in shaft 28, is connected to cross-bar arm 45.

Two conversion gears 46 of equal diameter and in intermeshing relation are mounted below cross-bar arm 45. Gears 46 and cross-bar arm 45 are interconnected by connecting rods 48 which are connected to an off-center pivotal point 49 on the two gears 46. It can thus be seen that rotation of the gears 46 will cause reciprocation of shaft 29 to cause displacement piston 23 to reciprocate within cylinder 21.

One of the axles 55 of gears 46 and one of the axles 56 of gears 36 is indexedly connected to varying-radius gears 57 and 58 respectively. The two varying-radius gears 55 and 58 are arranged to mutually engage a similar varying-radius gear 60 connected in driving relation with rotating power output shaft 30.

Rotation of the power output shaft through gear 60 translates the torque through gears 57 and 58 to the symmetrical gears 46 and 36 to cause the pistons 23 and 20 to reciprocate in timed sequence within the bore of cylinder 21. Of course, the reciprocation of the reverse is true wherein reciprocation of the two pistons will cause a concurrent rotation of power output shaft 30.

It should be noted that the centers of rotation of each of gears 57 and 58 should be about 90° apart with respect to the center of rotation of gear 60. Also, the direction of rotation of all these gears should be such that the movement of the displacement piston in any certain phase of operation precedes by about 90° the similar movement of the power piston.

A second cylinder C is formed opposite cylinder A and which includes a power piston 63 and a displacement piston 61, both reciprocally mounted within bore 62 of the cylinder. The displacement piston 61 is connected to the far end of shaft 29 and power piston 63 is connected to the far end of shaft 28. By this means both power pistons 20 and 63 will move in reciprocal unison as well as the two displacement pistons 23 and 61. It will also be seen that by this system only the instantaneous net forces of expansion and compression of the two power pistons are transmitted to their timing gears; whereas in a single cylinder system the plus gross expansion force is transmitted, later followed by the minus gross compression force. The pistons 23, 29, 63, and 61 are provided with appropriate sealing rings at 64 to eliminate gas leakage between the piston and the cylinder walls.

Figure 3:
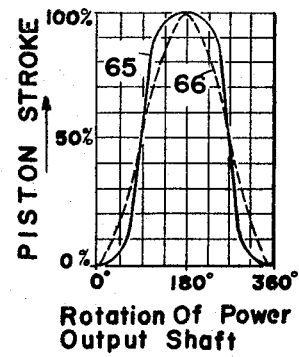
FIG. 3 is a graph showing the relationship of piston stroke to the degree of the power shaft rotation; normal cosine action vs. action because of varying-radius gearing.

The varying-radius gear train including gears 57, 60, and 58 is so arranged that the effective gear ratio between the respective gears varies with the angle of each gear to its meshed adjoining gear, each of the gears being center-shafted and varying-radius is provided in successive axes with different lengths of radii. Thus, when the long axis of one gear is in driving relation with the short axis of its neighbor, there will be, for example, a two to one gear ratio. When the opposite is true in such a case, there will be a one to two gear ratio. At positions in between the two aforesaid extremes, there will be a rate of change between the two ratios. It can be seen in this arrangement that with a constant rate of rotation being provided for power output shaft 30, there will be an instantaneously varying rate of rotation imparted to the two sets of timing gears 46 and 36. The change in velocity is indicated in FIG. 3 in which solid line 65 shows the piston movement with the varying-radius gears and broken line 66 shows typical piston movement as would be obtained by non-varying-radius gears. The variable, of course, depends upon the geometry of the varying-radius gears and the angle of the varying-radius gear 60 to the two planetary varying-radius gears 57 and 58. The position and the shape of gears 60, 57, and 58 is such as to obtain a timing relationship of the power and displacement pistons, somewhat as shown in FIGS. 4A through 4D and FIGS. 5A and 5B.

Figures 4A, 4B, 4C, 4D:
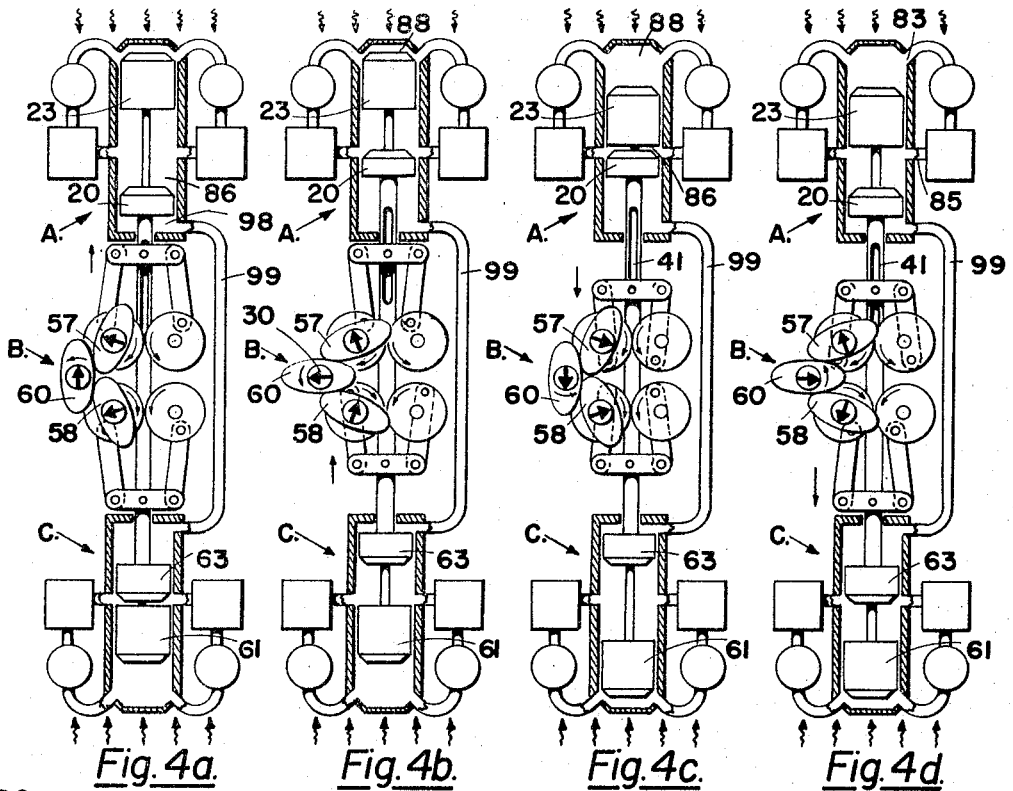
FIGS. 4A through 4D are schematic views showing the cycle of operation showing the principal embodiment of the invention.

The cycle of operation as referred to in cylinder A includes in FIG. 4A a position where the displacement piston 23 is near top dead center and the power piston 20 is near bottom dead center, to a position as shown in FIG. 4B where power piston 20 is raised to near top dead center with displacement piston 23 remaining near top dead center. In the respective sequence as shown in 4C power piston 20 remain near top dead center and the displacement piston 23 moves down to near bottom dead center position, and in FIG. 4D displacement piston 23 remains near bottom dead center while the power piston 20 moves to near bottom dead center. The aforesaid sequence is obtained by, as seen in FIG. 4A, positioning the power output varying-radius gear 60 with one of its small radius segments in contact with a longer radius segment of varying-radius gear 57 so that maximum motion is translated to effect the upper movement of power piston 20. At the same time varying-radius gear 58 is arranged with a smaller radius segment engaged with a larger radius section of varying-radius gear 60 so that the minimum rotation is translated at this instance to displacement piston 23.

In the next phase, the gear relationships of the three gears 57 and 58 is reversed with respect to gear 60 to cause power piston 20 to have the minimum motion and displacement piston 23 to have the maximum motion.

In FIG. 4C, gear ratio is again reversed and is in the same proportion as shown in FIG. 4A, thereby causing displacement piston 23 to remain relatively static and the power piston 20 to move at a relatively rapid rate.

In FIG. 4D, the gear relation is again shifted so that maximum motion is translated to the displacement piston 23 and the power piston 20 therein remains relatively static. With this combination, the desired operational characteristic of the Stirling-type heat cycle is readily obtainable.

The provisions to attain the aforesaid power comparison includes an external cooling system 80, a heat regenerator 81, and a heating element 87. Gas entry into the top of the bore of cylinder 21 is provided through ports 83. Ports 83 are located near the top of the cylinder in the area 88 defined between the top of displacement piston 23 and the top of the cylinder. The gas passage is arranged so that gas may travel from area 88 through heating element 87, through heat regenerator 81, through cooling system 80, and thereafter enter through ports 85 into the power chamber 86 formed in the areas between the bottom of displacement piston 23 and the top of power piston 20. Working gas is thus confined to the compression or power chamber 86, transfer tubes through external cooling system 80, heat regenerator 81, transfer tubes through heating element 87, and the space 88 between the top of the displacement piston and the cylinder top.

The heat regenerator can be of more or less conventional design, and may take the configuration of a chamber housing a porous material of suitable characteristics which will absorb heat from gas and which will transfer the heat back to the gas. External heat is provided to the top of the cylinder and to heating element 87 by conventional means, such as might be embodied in a burner or electrical heating elements. The cooling system 80 can encompass manifold 89 into which cold fluid, such as water, can be flowed through an inlet 90 and out an outlet 91.

With the aforesaid heating and cooling elements and the gas of appropriate characteristics, the device will operate in the Stirling mode of operation which includes, as shown in the transfer in the conditions shown in FIG. 4A to the conditions shown in FIG. 4B, the upward movement of power piston 20. This causes the relatively cool gas in power chamber 86 to be compressed, with the heat of compression being removed by the cooling system. The gas during transfer picks up stored heat in regenerator 81 and receives further external heat from heating element 87. This occurs, as shown in FIG. 4C, when the displacement piston moves downwardly to allow the heated gas to flow into the space between the top of the displacement piston and the top of the cylinder. The gas in this space is continuously thereafter also heated by the exterior burner which is indicated by wiggly arrows 87. This heated gas creates increased pressure. The pressure is transferred back to the power chamber 86 to forcefully cause power piston 20 to move downwardly in the power stroke as shown in the movement between FIGS. 4C and 4D. As the hot gas moves through heating element 87 to regenerator 81, it there gives up heat to the then cool regenerator, and with diminishing pressure in the whole system, moves into power chamber 86 to produce power by forcing down the power piston. At the completion of the power stroke, displacement piston 23 moves upwardly to force the remaining gas into power chamber 86. The gas during the aforesaid transfer is further cooled by giving up more heat to the regenerator so that the pressure within the power chamber is thereafter lower. It can be seen that cylinder C operates like cylinder A, but that the various elements bear a relationship of 180° out of phase with respect to the elements of cylinder A, thus causing the total unit to operate in a more or less pushpull mode. It should be noted that the preferred operation of the opposed two cylinder engine may be horizontal to minimize the effects of gravitational force.

Figure 5A:
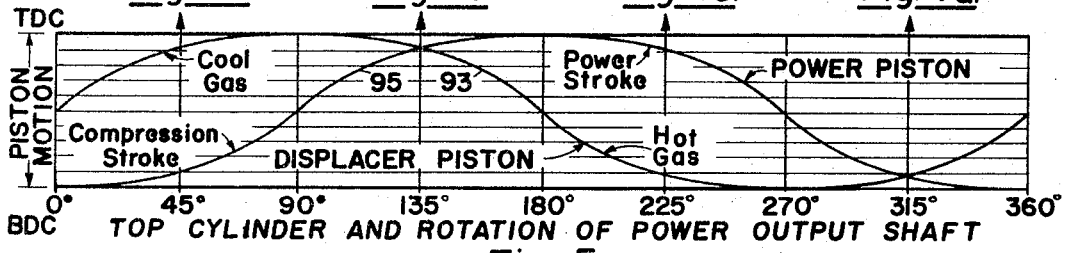
FIG. 5A is a timing diagram showing the movement of the pistons in the upper of the two cylinders as shown in the timing chart of FIGS. 4A through 4D.
Figure 5B:
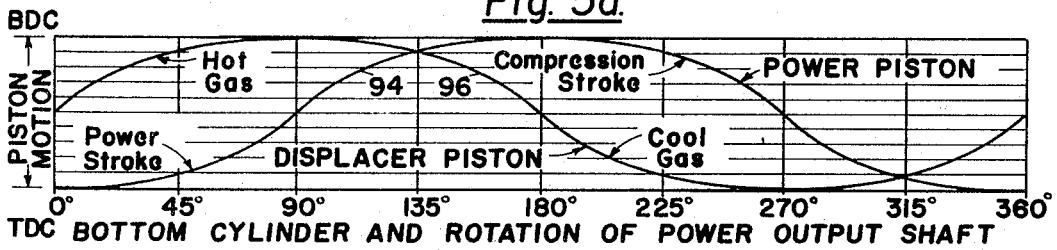
FIG. 5B is a timing diagram showing the similar piston's movement in the lower of the two cylinders.

It can be seen, as shown in FIG. 5A, that the varying-radius gears connected to the driving mechanism for the displacement of power pistons enable the timing relationship for the two pistons to be calculated in almost theoretical optimum relationship which causes the translation of motion to the pistons sequentially so that one piston as seen at lines 93 and 94 is moving while the opposite piston as seen at lines 95 and 96 is in a relatively static state. This relationship allows for a greater utilization of power and consequently better efficiency.

It is noted that the area 98 between power piston 20 and the bottom of the bore of cylinder 21 decreases when the power piston is moved in the power stroke. Thus, in order to minimize pressure variations, it is necessary to release the gas pressure in the aforesaid area 98. In the present engine, when operating in an opposed double cylinder mode, the area 98 of the opposite cylinder will work in an inverse relationship so that gas transfer can be accomplished through a transfer tube as shown at 99. It will transfer the gas from area 98 of one cylinder into the similar area 98 of the opposite cylinder during the operation of the engine. Thus, the volume for the gas remains constant and the only drag occasioned is that necessary to transfer the gas from one of the areas of 98 to the other during the various phases of operation. In previous engines of the Stirling-type, various gas buffer storage areas were necessitated. In the present invention, the opposed cylinder relationship affords the facility for gas transfer between cylinders, thus eliminating the need for such buffer storage mechanisms.

It will be noted that power output shaft 30 can be externally driven, which will cause the unit to function in a refrigerating mode. In the aforesaid refrigerating cycle, the same advantage of almost optimum efficiency is obtained because in a cylinder one piston accomplishing work in any particular phase is working against a relatively static other piston to effect greater efficiency of operation.

While one embodiment of this invention has been shown and described, it will be apparent that other adaptations and modifications can be made without departing from the true spirit and scope of the invention.

What is claimed is:

1. In an external heat engine of the type having power and displacement pistons reciprocally mounted within cylinders, shaft means connected independently to each of said pistons to translate reciprocal motion of said pistons externally of said cylinder, conversion means connected to each of said shafts to translate the reciprocal motion of said shafts to rotary motion, a varying-radius gear train having, a first varying-radius gear connected to rotate with said conversion means for said power piston, a second varying-radius gear connected to rotate with said conversion means for said displacement piston, and a third varying-radius gear means connected to rotate in driving relationship with said first and second varying-radius gear means, said first and second gears being positioned each to have the elongated radius section of the gear engaged with the short radius section of the third gear when the respective piston is adjacent the top and bottom dead centers of their respective strokes.

2. In an external heat engine in which a power piston and a displacement piston are reciprocally moved within a cylinder and in which hot and cold gases are transferred between the power and displacement pistons to a position between the displacement piston and the top portion of the cylinder, the improvement comprising shaft means connected to reciprocally drive each of said pistons, gear means connected to said shaft means, said gear means having a crankshaft, first gear means connected to said crankshaft and second gear means connected to said shaft means, said first and second gear means having a variable gear ratio timed to provide one gear ratio between the first gear means and the second gear means for each piston while the piston is translating from one position to another position within said cylinder and another gear ratio when said piston is at the extreme end of its travels through said cylinder.

3. A device according to claim 2 and wherein said first and second gear means comprises center-shafted gears.

4. A device according to claim 2 and wherein said first and second gear means comprises varying-radius gears.

5. In an external heat type engine of the type having a cylinder, a displacement piston, and a power piston reciprocally movable within said piston, means to transfer gas from the cylinder area on one side of the displacement piston to the opposite side of the displacement piston, means to heat the gas upon entry of the gas into one side of the displacement piston and to cool the gas upon entry on the opposite side of the displacement piston in the area between the power and displacement pistons, the improvement comprising a pair of shafts connected to said power and displacement pistons, one of said shafts slidably coaxially mounted within the other of said shafts, a pair of conversion means with one conversion means of the pair connected to each said shaft to translate the reciprocal motion of each of said shafts to a rotary motion, a pair of varying-radius gears connected to the pair of conversion means and a third varying-radius gear connected in driving relationship to both of said varying-radius gears.

6. In an external heat type engine of the type having a cylinder, a displacement piston, and a power piston reciprocally movable within said piston, means to transfer gas from the cylinder area on one side of the displacement piston to the opposite side of the displacement piston, means to heat the gas upon entry of the gas into one side of the displacement piston and to cool the gas upon entry on the opposite side of the displacement piston in the area between the power and displacement pistons, the improvement comprising a pair of shafts connected to said power and displacement pistons, one of said shafts slidably coaxially mounted within the other of said shafts, first and second conversion means connected to said shafts to translate reciprocal motion of said shafts to a rotary motion, the first conversion means engaged with the shaft driving said displacement piston and the second said conversion means engaged with the shaft connected to said power piston, first varying-radius gear means connected in interdriven relationship with said first conversion means, second varying-radius gear means connected in interdriven relationship to said second gear means, and third varying-radius gear means connected in interdriven relationship to both first and second radius gears.

7. In an external heat type engine of the type having a cylinder, a displacement piston, and a power piston reciprocally movable within said piston, means to transfer gas from the cylinder area on one side of the displacement piston to the opposite side of the displacement piston, means to heat the gas upon entry of the gas into one side of the displacement piston and to cool the gas upon entry on the opposite side of the displacement piston in the area between the power and displacement pistons, the improvement comprising a pair of shafts connected to said power and displacement pistons, one of said shafts slidably coaxially mounted within the other of said shafts, first and second gear means connected to said shafts to translate reciprocal motion of said shafts to a rotary motion, the first gear means engaged with the shaft driving said displacement piston and the second said gear means engaged with the shaft connected to said power piston, a first varying-radius gear connected in interdriven relationship with said first gear means, a second varying-radius gear connected in interdriven relationship with said second gear means, a third varying-radius gear connected in interdriven relationship to both first and second radius gears, said first and third varying radius gears timed to provide a greater gear ratio for said first gear relative to said third gear when said displacement piston is adjacent the top and the bottom of the stroke and a lesser gear ratio when said displacement piston is adjacent midway the top and the bottom of the stroke, said second and third varying-radius gears timed to provide a greater ratio for said second gear relative to said third gear when said power piston is adjacent the top and the bottom of the stroke and a lesser gear ratio when said power piston is adjacent midway between the top and the bottom of the stroke.

8. In an external heat type engine the combination of a pair of opposed cylinders, each cylinder having a displacement piston mounted for reciprocal movement within said piston toward and away from a first end of the cylinder, a power piston reciprocally mounted within the cylinder movable toward and away from a second end of said cylinder, fluid communication means to transfer gas from the cylinder area between said displacement piston and the first end of the cylinder to the area between said displacement and power piston, means to heat the gas in said fluid communication means for entry into the area between the displacement piston and the first end of said cylinder and to cool the gas for entry into the area between the power and displacement pistons, first shaft means connected to the displacement pistons in both cylinders, second shaft means slidably reciprocally mounted within said first shaft means and connected to the power pistons in both cylinders, a drive shaft, first varying-radius gear means connecting said first shaft to said drive shaft and second varying-radius gear means interconnecting said second shaft to said drive shaft.

9. In an external heat type engine the combination of a pair of opposed cylinders, each cylinder having a displacement piston mounted for reciprocal movement within said piston toward and away from a first end of the cylinder, a power piston reciprocally mounted within the cylinder movable toward and away from a second end of said cylinder, fluid communication means to transfer gas from the cylinder area between said displacement piston and the first end of the cylinder to the area between said displacement and power piston, means to heat the gas in said fluid communication means for entry into the area between the displacement piston and the first end of said cylinder and to cool the gas for entry into the area between the power and displacement pistons, first shaft means connected to the displacement pistons in both cylinders, second shaft means slidably reciprocally mounted within said first shaft means and connected to the power pistons in both cylinders, a drive shaft, first varying-radius gear means connecting said first shaft to said drive shaft, second varying-radius gear means interconnecting said second shaft to said drive shaft, and second fluid communication means interconnecting both cylinders together at areas between said power piston and said second ends of the cylinder.

10. In an external heat type engine the combination of a pair of opposed cylinders, each cylinder having a displacement piston mounted for reciprocal movement within said piston toward and away from a first end of the cylinder, a power piston reciprocally mounted within the cylinder movable toward and away from a second end of said cylinder, fluid communication means to transfer gas from the cylinder area between said displacement piston and the first end of the cylinder to the area between said displacement and power piston, means to heat the gas in said fluid communication means for entry into the area between the displacement piston and the first end of said cylinder and to cool the gas for entry into the area between the power and displacement pistons, first shaft means connected to the displacement pistons in both cylinders, second shaft means slidably reciprocally mounted within said first shaft means and connected to the power pistons in both cylinders, a drive shaft, first converting means connected to said first shaft to translate reciprocal said first shaft to rotary motion, second converting means connected to said second shaft to translate reciprocal motion of said second shaft to rotary motion, first varying-radius gear means connected to said first converting means and said drive shaft, second varying-radius gear means connected to said second converting means and said drive shaft, said first varying-radius means timed to provide the smallest radius exposure to said drive shaft when said displacement pistons are approximately midway between the top and the bottom of their respective strokes and said second varying-radius gear timed to expose the minimum radius section to said drive shaft when said power pistons are approximately midway between the top and bottom of their strokes respectively.

11. In an external heat type engine according to claim 10 and wherein said first and second varying-radius gears comprise a generally elliptical shaped gear connected directly to said conversion means and a complementary generally elliptical shaped gear connected to said drive shaft timed to rotate in approximate phase opposition.

12. In an external heat type engine the combination of a pair of opposed cylinders, each cylinder having a displacement piston mounted for reciprocal movement within said piston toward and away from a first end of the cylinder, a power piston reciprocally mounted within the cylinder movable toward and away from a second end of said cylinder, fluid communication means to transfer gas from the cylinder area between said displacement piston and the first end of the cylinder to the area between said displacement and power piston, means to heat the gas in said fluid communication means for entry into the area between the displacement piston and the first end of said cylinder and to cool the gas for entry into the area between the power and displacement pistons in both cylinders, second shaft means slidably reciprocally mounted within said first shaft means and connected to the power pistons in both cylinders, a drive shaft, first varying-radius gear means connecting said first shaft to said drive shaft and second varying-radius gear means connecting said second shaft to said drive shaft, said varying-radius gears timed to translate the greater amount of rotational movement to said drive shaft during the intervals that the respective pistons are adjacent the extremes of their strokes.

No references cited.

EDGAR W. GEOGHEGAN, *Primary Examiner.*